(12) United States Patent
Vetters

(10) Patent No.: US 10,480,337 B2
(45) Date of Patent: Nov. 19, 2019

(54) TURBINE SHROUD ASSEMBLY WITH MULTI-PIECE SEALS

(71) Applicant: Rolls-Royce North American Technologies, Inc., Indianapolis, IN (US)

(72) Inventor: Daniel K. Vetters, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 266 days.

(21) Appl. No.: 15/490,478

(22) Filed: Apr. 18, 2017

(65) Prior Publication Data

US 2018/0298773 A1 Oct. 18, 2018

(51) Int. Cl.
*F01D 25/24* (2006.01)
*F01D 11/00* (2006.01)

(52) U.S. Cl.
CPC .......... *F01D 11/005* (2013.01); *F01D 25/246* (2013.01); *F05D 2230/642* (2013.01); *F05D 2240/11* (2013.01); *F05D 2300/6033* (2013.01); *Y02T 50/672* (2013.01)

(58) Field of Classification Search
None
See application file for complete search history.

(56) References Cited

U.S. PATENT DOCUMENTS

| | | |
|---|---|---|
| 3,836,159 A | 9/1974 | Dryer |
| 4,219,203 A | 8/1980 | Lovelace et al. |
| 4,248,439 A | 2/1981 | Haslett |
| 4,441,726 A | 4/1984 | Uhl |
| 4,457,523 A | 7/1984 | Hailing et al. |
| 4,500,098 A | 2/1985 | Wilcox et al. |
| 4,602,888 A | 7/1986 | Court et al. |
| 5,014,917 A | 5/1991 | Sirocky et al. |
| 5,074,748 A | 12/1991 | Hagle |
| 5,088,888 A | 2/1992 | Bobo |
| 5,154,577 A | 10/1992 | Kellock et al. |
| 5,236,202 A | 8/1993 | Krouth et al. |
| 5,358,262 A | 10/1994 | Roberts |
| 5,639,100 A | 6/1997 | Garrigues et al. |
| 6,042,315 A | 3/2000 | Miller et al. |

(Continued)

FOREIGN PATENT DOCUMENTS

| | | |
|---|---|---|
| EP | 1350927 A2 | 10/2003 |
| EP | 2357322 A2 | 8/2011 |

(Continued)

OTHER PUBLICATIONS

Extended EP Search Report completed Oct. 26, 2018 and issued in connection with EP Appln. No. 18163358.7.

(Continued)

*Primary Examiner* — Michael Lebentritt
(74) *Attorney, Agent, or Firm* — Barnes & Thornburg LLP

(57) ABSTRACT

An assembly adapted for use in a gas turbine engine has a carrier component, a supported component, and a seal adapted to resist the flow of gasses between the supported component and the carrier component. In an illustrative embodiment, the assembly is a turbine shroud segment for resisting gasses from passing over turbine blades included in the gas turbine engine.

18 Claims, 7 Drawing Sheets

(56) References Cited

U.S. PATENT DOCUMENTS

| | | | |
|---|---|---|---|
| 6,045,310 | A | 4/2000 | Miller et al. |
| 6,126,389 | A | 10/2000 | Burdgick |
| 6,164,656 | A | 12/2000 | Frost |
| 6,773,215 | B2 | 8/2004 | Cuva et al. |
| 6,830,437 | B2 | 12/2004 | Cairo et al. |
| 6,857,639 | B2 | 2/2005 | Beeck et al. |
| 6,883,807 | B2 | 4/2005 | Smed |
| 6,884,026 | B2 | 4/2005 | Glynn et al. |
| 7,044,709 | B2 | 5/2006 | Bruce et al. |
| 7,090,224 | B2 | 8/2006 | Iguchi et al. |
| 7,090,459 | B2 | 8/2006 | Bhate et al. |
| 7,117,983 | B2 | 10/2006 | Good et al. |
| 7,258,942 | B2 | 8/2007 | Chou et al. |
| 7,278,820 | B2 | 10/2007 | Keller |
| 7,347,425 | B2 | 3/2008 | James |
| 7,416,362 | B2 | 8/2008 | North |
| 7,434,670 | B2 | 10/2008 | Good et al. |
| 7,451,989 | B1 | 11/2008 | Cornett et al. |
| 7,494,317 | B2 | 2/2009 | Keller et al. |
| 7,497,443 | B1 | 3/2009 | Steinetz et al. |
| 7,563,071 | B2 | 7/2009 | Campbell et al. |
| 7,581,399 | B2 | 9/2009 | Farah et al. |
| 7,722,317 | B2 | 5/2010 | Schiavo et al. |
| 7,726,936 | B2 | 6/2010 | Keller et al. |
| 7,736,122 | B1 | 6/2010 | Stone |
| 7,857,323 | B1 | 12/2010 | Berkes et al. |
| 7,874,059 | B2 | 1/2011 | Morrison et al. |
| 7,950,234 | B2 | 5/2011 | Radonovich et al. |
| 7,988,395 | B2 | 8/2011 | Steffier |
| 8,047,550 | B2 | 11/2011 | Behrens et al. |
| 8,047,773 | B2 | 11/2011 | Bruce et al. |
| 8,070,431 | B2 | 12/2011 | Harter et al. |
| 8,079,807 | B2 | 12/2011 | Shapiro et al. |
| 8,118,546 | B2 | 2/2012 | Morrison |
| 8,157,511 | B2 | 4/2012 | Pietrobon et al. |
| 8,210,799 | B1* | 7/2012 | Rawlings ............... F01D 11/005 277/654 |
| 8,256,088 | B2 | 9/2012 | James et al. |
| 8,459,042 | B2 | 6/2013 | Lohmueller |
| 8,511,972 | B2 | 8/2013 | Sutcu |
| 8,568,091 | B2 | 10/2013 | McCaffrey |
| 8,607,577 | B2 | 12/2013 | Ruberte Sanchez et al. |
| 8,616,801 | B2 | 12/2013 | Morrison et al. |
| 8,651,497 | B2 | 2/2014 | Tholen et al. |
| 8,740,552 | B2 | 6/2014 | Marusko et al. |
| 8,778,546 | B2 | 7/2014 | Farmer |
| 8,790,067 | B2 | 7/2014 | McCaffrey et al. |
| 8,794,640 | B2 | 8/2014 | Bergman et al. |
| 8,905,709 | B2 | 12/2014 | Dziech et al. |
| 8,926,270 | B2 | 1/2015 | Karafillis et al. |
| 8,932,009 | B2 | 1/2015 | Moraines et al. |
| 8,998,565 | B2 | 4/2015 | Foster et al. |
| 9,052,016 | B2 | 6/2015 | Twelves, Jr. |
| 9,175,579 | B2 | 11/2015 | Franks et al. |
| 9,341,072 | B2 | 5/2016 | Hanumanthan et al. |
| 9,399,924 | B2 | 7/2016 | Klingels |
| 9,435,266 | B2 | 9/2016 | Sutterfield et al. |
| 9,476,316 | B2 | 10/2016 | Hillier |
| 9,488,110 | B2 | 11/2016 | Chan et al. |
| 9,512,735 | B2 | 12/2016 | Davis |
| 9,534,500 | B2 | 1/2017 | Bouchard et al. |
| 9,581,038 | B2 | 2/2017 | Hillier et al. |
| 9,587,502 | B2 | 3/2017 | Davis et al. |
| 9,617,920 | B2 | 4/2017 | Headland |
| 9,726,043 | B2 | 8/2017 | Franks et al. |
| 9,745,854 | B2 | 8/2017 | Baldiga et al. |
| 9,759,079 | B2 | 9/2017 | Sippel et al. |
| 9,822,656 | B2 | 11/2017 | Bricaud et al. |
| 9,863,323 | B2 | 1/2018 | Kirtley et al. |
| 9,932,844 | B2 | 4/2018 | Sutterfield et al. |
| 9,945,256 | B2 | 4/2018 | Freeman et al. |
| 9,951,640 | B2 | 4/2018 | Westphal et al. |
| 9,957,827 | B2 | 5/2018 | Davis et al. |
| 10,047,624 | B2 | 8/2018 | O'Leary et al. |
| 10,082,085 | B2 | 9/2018 | Thomas et al. |
| 10,088,049 | B2 | 10/2018 | Davis et al. |
| 10,094,231 | B2 | 10/2018 | Dev et al. |
| 10,113,437 | B2 | 10/2018 | Davis et al. |
| 10,167,730 | B2 | 1/2019 | Davis et al. |
| 10,196,911 | B2 | 2/2019 | Jenkins et al. |
| 10,196,912 | B2 | 2/2019 | Davis et al. |
| 10,202,863 | B2 | 2/2019 | Davis et al. |
| 10,208,613 | B2 | 2/2019 | Davis et al. |
| 2004/0062639 | A1 | 4/2004 | Glynn et al. |
| 2005/0129499 | A1* | 6/2005 | Morris ............... F01D 9/04 415/1 |
| 2005/0220611 | A1* | 10/2005 | Bhate ............... F01D 11/025 415/173.3 |
| 2006/0082074 | A1 | 4/2006 | Synnott et al. |
| 2007/0031258 | A1 | 2/2007 | Campbell et al. |
| 2012/0260670 | A1 | 10/2012 | Foster et al. |
| 2013/0113168 | A1 | 5/2013 | Lutjen et al. |
| 2013/0156550 | A1 | 6/2013 | Franks et al. |
| 2014/0030072 | A1 | 1/2014 | Hillier et al. |
| 2014/0154062 | A1 | 6/2014 | Weber et al. |
| 2014/0271147 | A1 | 9/2014 | Uskert et al. |
| 2015/0044054 | A1* | 2/2015 | Loftus ............... G01P 15/18 416/220 R |
| 2015/0098829 | A1* | 4/2015 | Baldiga ............... F01D 11/003 416/179 |
| 2015/0167557 | A1* | 6/2015 | Thomas ............... F02C 7/28 60/796 |
| 2015/0377035 | A1* | 12/2015 | Freeman ............... F01D 11/12 416/191 |
| 2015/0377050 | A1* | 12/2015 | Freeman ............... F01D 11/08 416/185 |
| 2016/0177786 | A1 | 6/2016 | Sippel et al. |
| 2016/0186611 | A1* | 6/2016 | Vetters ............... F01D 25/246 415/173.2 |
| 2016/0245108 | A1* | 8/2016 | Sippel ............... F01D 11/005 |
| 2016/0333720 | A1 | 11/2016 | Davis |
| 2016/0348526 | A1 | 12/2016 | Vetters et al. |
| 2016/0348527 | A1* | 12/2016 | Vetters ............... F01D 9/04 |
| 2016/0376921 | A1* | 12/2016 | O'Leary ............... F01D 25/12 415/116 |
| 2017/0037740 | A1* | 2/2017 | O'Leary ............... F01D 9/02 |
| 2017/0101882 | A1* | 4/2017 | Sippel ............... F01D 11/08 |
| 2017/0298753 | A1* | 10/2017 | O'Leary ............... F01D 11/08 |
| 2018/0016924 | A1* | 1/2018 | Gallier ............... F01D 25/246 |
| 2018/0023408 | A1* | 1/2018 | Rice ............... F01D 11/08 415/173.1 |
| 2018/0106160 | A1* | 4/2018 | Thomas ............... F01D 11/08 |
| 2018/0149031 | A1 | 5/2018 | Sippel et al. |
| 2018/0149041 | A1* | 5/2018 | Freeman ............... F01D 11/08 |
| 2018/0149042 | A1* | 5/2018 | Freeman ............... F01D 11/005 |
| 2018/0230839 | A1* | 8/2018 | Gallier ............... F01D 11/02 |
| 2018/0238193 | A1* | 8/2018 | Baucco ............... F01D 25/246 |
| 2018/0298773 | A1 | 10/2018 | Vetters |
| 2018/0306045 | A1* | 10/2018 | Barrett ............... F01D 25/246 |

FOREIGN PATENT DOCUMENTS

| | | |
|---|---|---|
| EP | 2690260 A2 | 1/2014 |
| EP | 2886803 A1 | 6/2015 |
| EP | 3112600 A1 | 1/2017 |
| EP | 3115560 A1 | 1/2017 |

OTHER PUBLICATIONS

Dr. Dale Carlson, GE Aviation: Perspectives on Clean, Efficient, Engines, May 14, 2013, 41 pages.

Gregory S. Corman and Krishan L. Luhtra, Melt Infiltrated Ceramic Composites (Hipercomp®) For Gas Turbine Engine Applications, DOE/CE/41000-3, Jan. 2006, 507 pages.

Gregory S. Corman, Melt Infiltrated Ceramic Matrix Composites for Shrouds and Combustor Liners of Advanced Industrial Gas Turbines, Dec. 2010, 511 pages.

\* cited by examiner

TURBINE SHROUD ASSEMBLY WITH MULTI-PIECE SEALS

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds and other assemblies in gas turbine engines include components made from materials that have different coefficients of thermal expansion. Due to the differing coefficients of thermal expansion, the components can expand at different rates when exposed to combustion products. In some examples, sealing between and coupling such components can present challenges.

SUMMARY

The present disclosure may comprise one or more of the following features and combinations thereof.

In some embodiments, a turbine shroud assembly may include a metallic carrier, a blade track segment comprising ceramic matrix composite materials, and a multi-piece seal. In some embodiments, the blade track segment may be formed to include a runner shaped to extend partway around a central axis and an attachment portion that extends radially outward from the runner that mounts to the carrier to couple the blade track segment to the carrier. In some embodiments, the multi-piece seal may include components received in a first radially-inwardly opening channel formed in the carrier. In some embodiments, the multi-piece seal may engage the runner of the blade track segment to resist the flow of gasses through an interface between the carrier and the runner of the blade track segment.

In some embodiments, the multi-piece seal may include a forward wire arranged along a forward side of the first radially-inwardly opening channel an, an aft wire arranged along an aft side of the first radially-inwardly opening channel, and a rope seal arranged in the first radially-inwardly opening channel between the forward wire seal and the aft wire seal. In some embodiments, the rope seal may be sized to engage the forward wire seal and the aft wire seal such that the forward wire seal and the aft wire seal are pushed away from one another and radially inward into engagement with the carrier and the runner of the blade track segment.

In some embodiments, the carrier may be formed to include a plurality of buffer air passages spaced circumferentially around the radially-inwardly opening channel from one another and shaped to conduct buffer air into the radially-inwardly opening channel. In some embodiments, the rope seal may be a hollow braided or woven rope configured to permeably conduct buffer air from the buffer air passages into an internal hollow of the rope seal. In some embodiments, the rope seal may include ceramic core portions sized and arranged to be spaced apart from discharge openings formed by each of the plurality of buffer air passages.

In some embodiments, the first radially-inwardly opening channel may be arranged along a forward side of the blade track segment axially forward of the attachment portion of the blade track segment. In some embodiments, the carrier may be formed to include a second radially-inwardly opening channel that opens to face the runner of the blade track segment.

In some embodiments, the multi-piece seal may include a second forward wire arranged along a forward side of the second radially-inwardly opening channel, a second aft wire arranged along an aft side of the second radially-inwardly opening channel, and a second rope seal arranged in the second radially-inwardly opening channel between the second forward wire seal and the second aft wire seal. In some embodiments, the second rope seal may be sized to engage the second forward wire seal and the second aft wire seal such that the second forward wire seal and the second aft wire seal are pushed away from one another and radially inward into engagement with the carrier along a side of the second radially-inwardly opening channel and the runner of the blade track segment.

In some embodiments, the second radially-inwardly opening channel is arranged along an aft side of the blade track segment axially aft of the attachment portion of the blade track segment. In some embodiments, the carrier is formed to include axially-extending radially-inwardly opening channels that open to face the runner of the blade track segment, the axially-extending radially-inwardly opening channels interconnect the first radially-inwardly opening channel and the second radially-inwardly opening channel. In some embodiments, the multi-piece seal includes components received in the axially-extending radially-inwardly opening channels such that the multi-piece seal surrounds the attachment portion of the blade track segment on forward, aft, and circumferential sides.

In some embodiments, the attachment portion of the blade track segment forms a T shape when viewed in the circumferential direction such that the entire blade track segment forms an I-beam shape when viewed in the circumferential direction. In some embodiments, a gap is formed between the carrier and the runner of the blade track segment along an aft side of the blade track segment axially aft of the attachment portion of the blade track segment without an intervening seal that engages the runner of the blade track segment such that a mechanical moment is not induced onto the runner of the blade track segment by engagement of the runner aft of the attachment portion.

In some embodiments, a assembly adapted for use in a gas turbine engine comprises: a carrier component, a supported component, and a multi-piece seal. In some embodiments, the supported component is formed to include a heat shield shaped to extend partway around a central axis and an attachment portion that extends radially outward from the heat shield to couple the supported component to the carrier component. In some embodiments, the multi-piece seal includes components received in a radially-inwardly opening channel formed in the carrier component. In some embodiments, the multi-piece seal engages the heat shield of the supported component to resist the flow of gasses through an interface between the carrier component and the heat shield of the supported component.

In some embodiments, the multi-piece seal includes a first wire arranged along a first side of the radially-inwardly opening channel, a second wire arranged along a second side of the first radially-inwardly opening channel, and a rope seal arranged in the radially-inwardly opening channel between the first wire seal and the second wire seal. In some embodiments, the rope seal is sized to engage the first wire seal and the second wire seal such that the first wire seal and the second wire seal are pushed away from one another and radially inward into engagement with the carrier component and the heat shield of the supported component.

In some embodiments, the carrier component is formed to include a plurality of buffer air passages spaced from one another and shaped to conduct buffer air into the radially-inwardly opening channel. In some embodiments, the rope seal is a hollow braided or woven rope configured to permeably conduct buffer air from the buffer air passages into an internal hollow of the rope seal. In some embodiments, the rope seal is sized and arranged to be spaced apart from discharge openings formed by each of the plurality of buffer air passages.

In some embodiments, the carrier component comprises metallic materials and the supported component comprises ceramic materials. In some embodiments, the supported component comprises ceramic matrix composite materials. In some embodiments, the multi-piece seal surrounds the attachment portion of the supported component on forward, aft, and circumferential sides.

According to another aspect of the present disclosure, a turbine shroud assembly adapted for use in a gas turbine engine may include: a carrier comprising metallic materials, a blade track segment, and a multi-piece seal. In some embodiments, the carrier is formed to include a radially-inwardly opening channel and a plurality of buffer air passages spaced from one another and shaped to conduct buffer air into the radially-inwardly opening channel. In some embodiments, the blade track segment comprises ceramic matrix composite materials and is formed to include a runner shaped to extend partway around a central axis and an attachment portion that extends radially outward from the runner that engages the carrier to couple the blade track segment to the carrier.

In some embodiments, the multi-piece seal is received in a radially-inwardly opening channel formed in the carrier and engaged with the runner of the blade track segment to resist gasses from moving through an interface between the carrier and the blade track segment. In some embodiments, the multi-piece seal includes a forward seal element arranged along a forward side of the radially-inwardly opening channel and an aft seal element arranged along an aft side of the radially-inwardly opening channel. In some embodiments, the forward seal element includes a plurality of lobes arranged to receive buffer air from the buffer air passages formed in the carrier and shaped to cause the forward seal to expand in the radial direction upon receipt of buffer air from the buffer air passages formed in the carrier. In some embodiments, the aft seal element includes a plurality of lobes arranged to receive buffer air from the buffer air passages formed in the carrier and shaped to cause the aft seal to expand in the radial direction in response to receipt of buffer air from the buffer air passages formed in the carrier.

In some embodiments, each of the forward seal element and the aft seal element are formed to include two lobes such that each of the forward seal element and the aft seal element have an E-shape when viewed in the circumferential direction. In some embodiments, the carrier is formed to include a locator that extends into the radially-inwardly opening channel between the first seal element and the second seal element, and at least one of the buffer air passages is formed through the locator.

These and other features of the present disclosure will become more apparent from the following description of the illustrative embodiments.

DETAILED DESCRIPTION OF THE DRAWINGS

Figure 1:
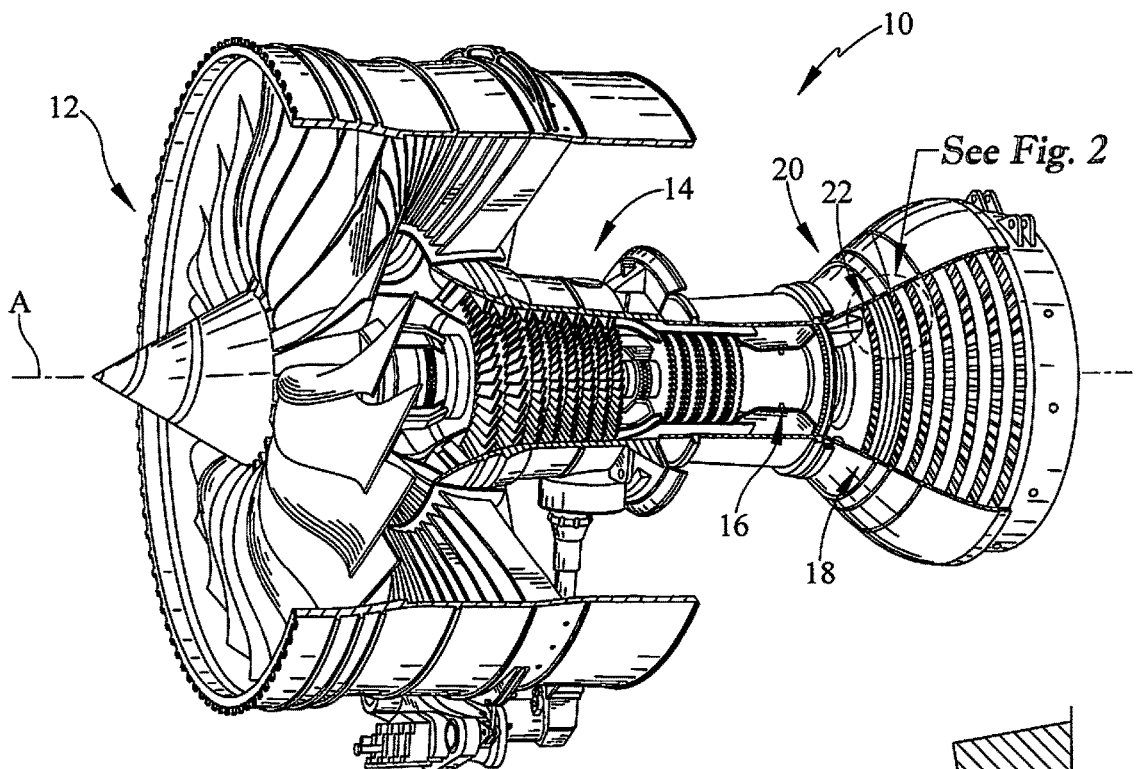
FIG. 1 is a cut-away perspective view of a gas turbine engine showing that the exemplary engine includes a fan driven by an engine core having a compressor, a combustor, and a turbine.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
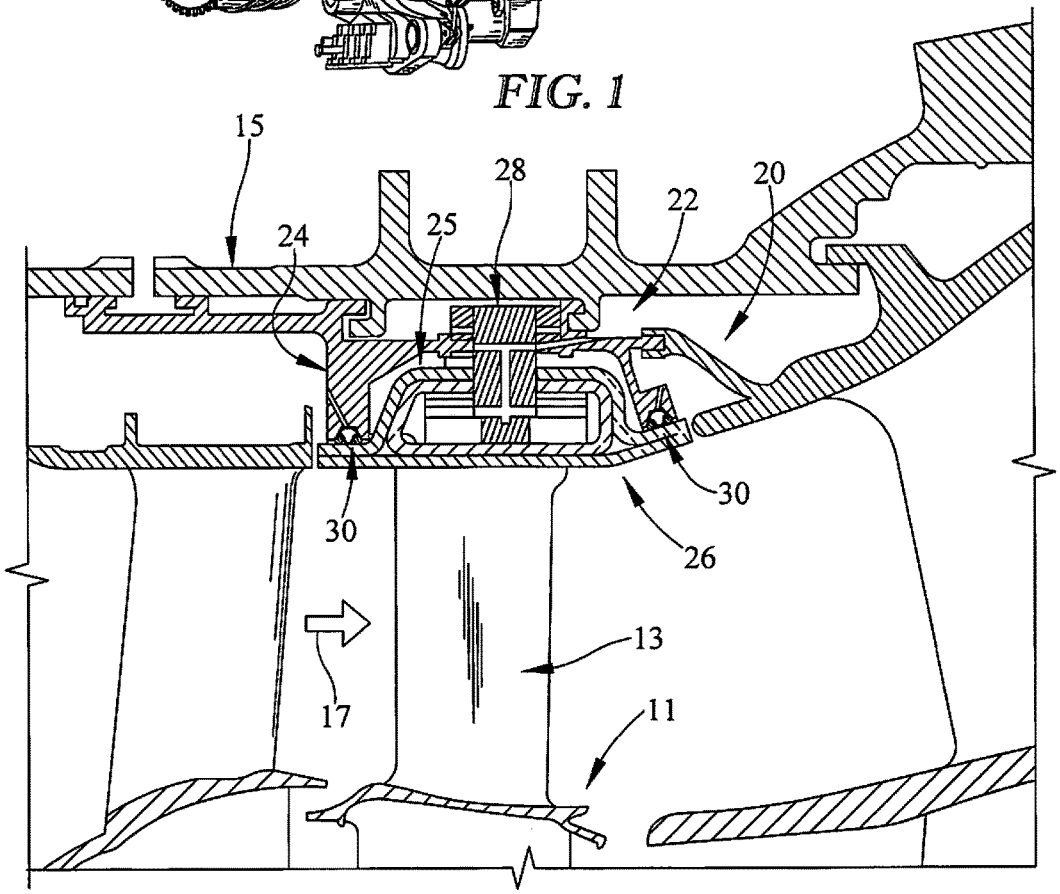
FIG. 2 is a partial cross-sectional view of the gas turbine engine of FIG. 1 showing the arrangement of a turbine shroud assembly radially outward from blades of a turbine wheel assembly to suggest that the turbine shroud resists gasses from passing over the blades without interacting with the blades.

The turbine 18 includes at least one turbine wheel assembly 11 and a turbine shroud assembly 20 positioned to surround the turbine wheel assembly 11 as shown in FIGS. 1 and 2. Turbine shroud assembly 20 is coupled to an outer turbine case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
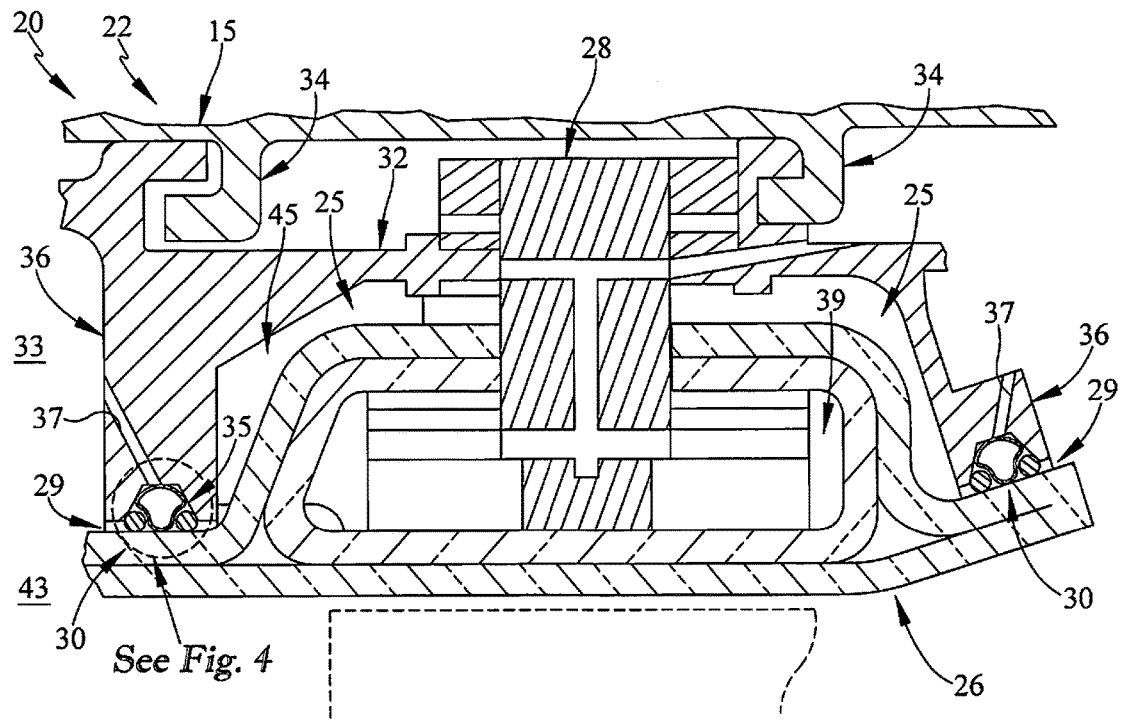
FIG. 3 is a detail view of a portion of FIG. 2 showing a turbine shroud segment included in the turbine shroud assembly of FIG. 2 and showing that the turbine shroud segment includes a carrier, a blade track segment, multi-piece seals that resist the flow of gas through interfaces between the carrier and the blade track segment, and a mount assembly for coupling the blade track segment to the carrier.

Turbine shroud assembly 20 extends around the turbine wheel assembly 11 to block combustion products from passing over the blades 13 without pushing the blades 13 to rotate as suggested in FIG. 2. In the illustrative embodiment, turbine shroud assembly 20 is made up of a number of shroud segments 22, one of which is shown in FIG. 3. Each shroud segment 22 extends only part-way around the central axis A and cooperate with other shroud segments 22 to surround the turbine wheel assembly 11.

In other embodiments, turbine shroud assembly 20 is annular and non-segmented to extend fully around the central axis A and surround the turbine wheel assembly 11. In yet other embodiments, certain components of turbine shroud assembly 20 are segmented while other components are annular and non-segmented.

Figure 4:
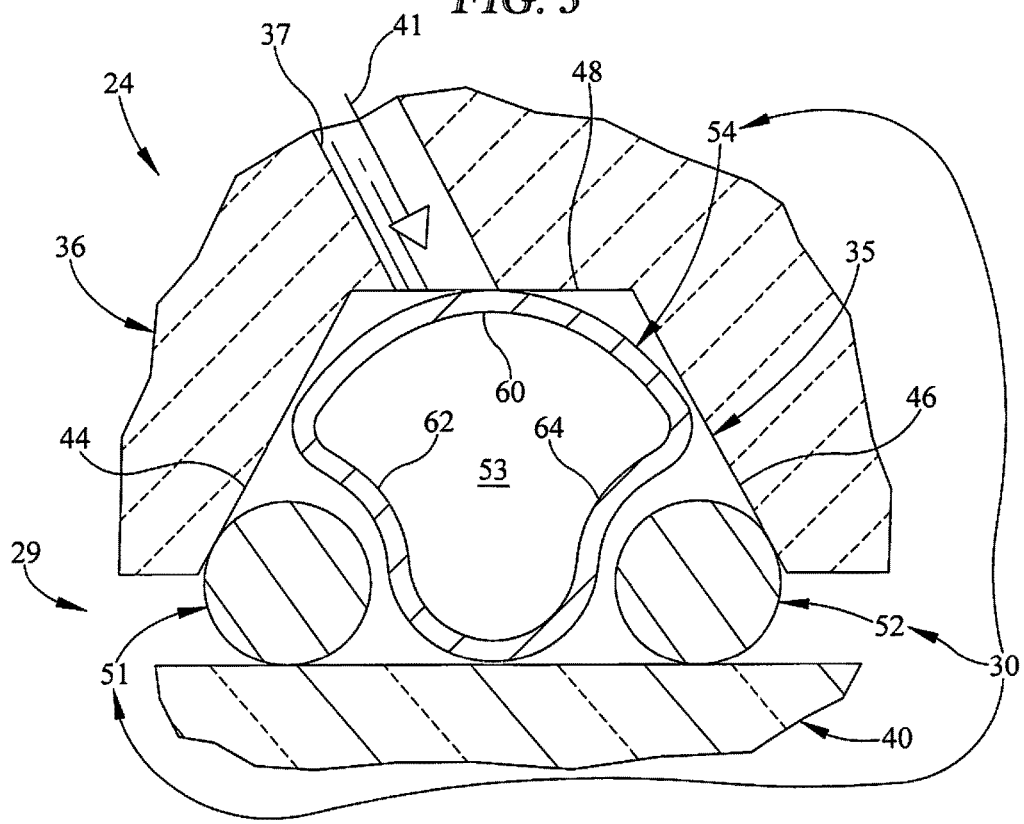
FIG. 4 is an enlarged detail view of a portion of FIG. 3 showing the multi-piece seal contained within a radially-inwardly opening channel formed by the carrier and showing that the multi-piece seal includes a first wire, a second wire and a rope between the first wire and the second wire.
Figure 5:
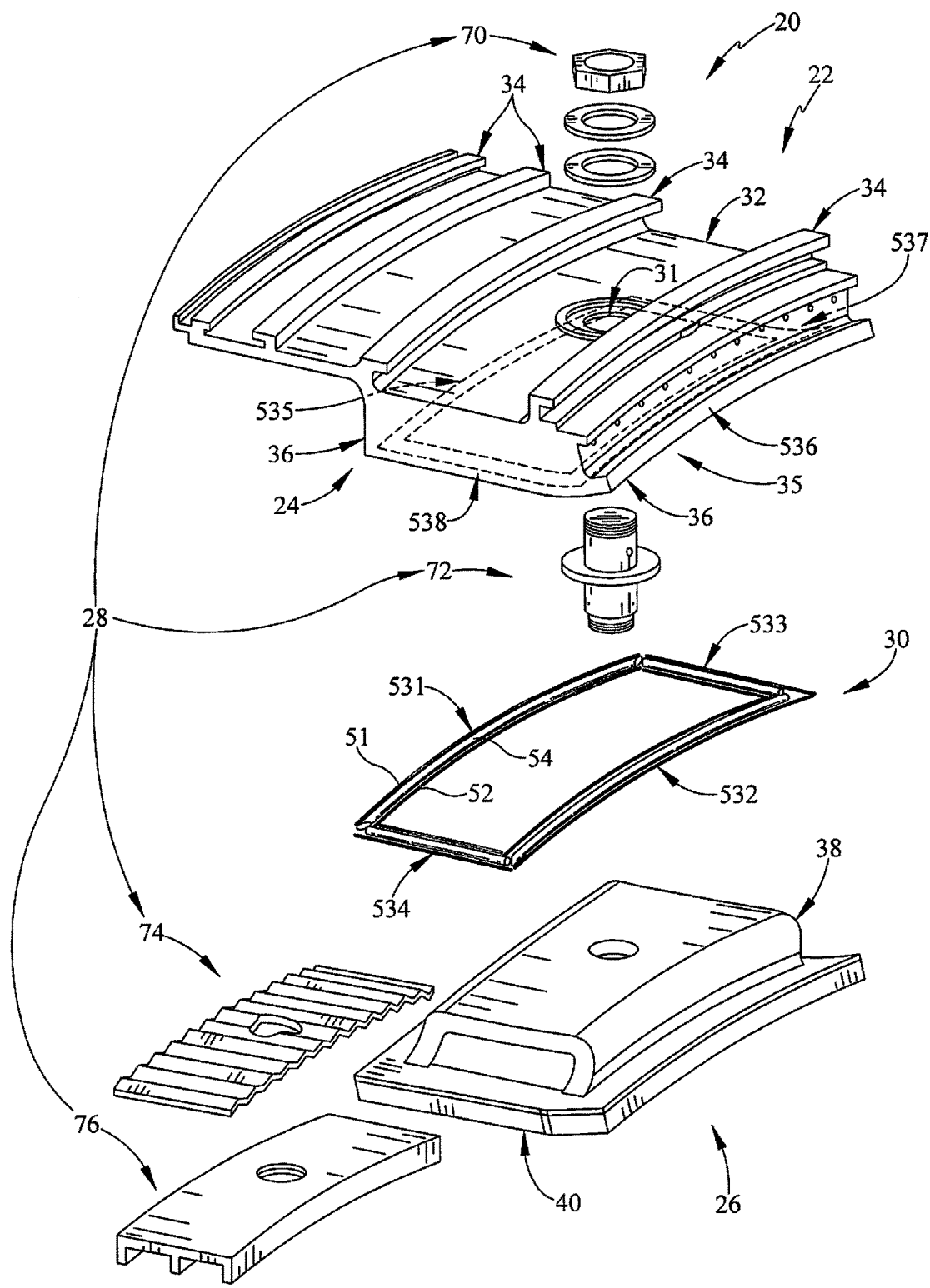
FIG. 5 is an exploded perspective assembly view of the turbine shroud segment of FIG. 3 showing that the multi-piece seal of the blade track segment includes a forward seal portion, an aft seal portion, a first circumferential seal portion, and a second circumferential seal portion, and showing that the mounting system includes a nut, a threaded shaft configured to be coupled to the nut, a bias spring between the carrier and the blade track segment, and a retainer plate below the bias spring.

Turbine shroud segment 22 illustratively includes a carrier 24, a blade track segment 26, a mounting system 28 and a multi-piece seal 30 as shown in FIGS. 3 and 5. Carrier 24 is a metallic component mounted in engine 10 and is configured to support the blade track segment 26 in position adjacent to the blades 13 of the turbine wheel assembly 11. Carrier 24 is arranged to define an interior carrier space 25 that is adapted to receive at least a portion of blade track segment 26. Blade track segment 26 is a ceramic-matrix composite component adapted to withstand high temperatures and directly faces blades 13 that interface with high temperature gasses. Mounting system 28 is configured to couple the blade track segment 26 to the carrier 24 such that blade track segment 26 is properly located. Multi-piece seal 30 is arranged radially between carrier 24 and blade track segment 26 and engages carrier 24 and blade track segment 26 to resist the flow of gasses through an interface 29 between carrier 24 and blade track segment 26 as shown in FIGS. 3 and 4.

Multi-piece seal 30 is assembled into a channel 35 formed by carrier 24 and illustratively includes a first wire 51, a second wire 52, and a rope 54 arranged between the wires 51, 52 as shown in FIG. 4. First and second wires 51, 52 are pushed toward engagement with carrier 24 and blade track segment 26 at the edges of the channel 35 by the rope 54 so as to close interface 29 between carrier 24 and blade track segment 26. In addition, the channel 35 is fed high pressure air 41 via a passage 37 to further encourage the first and second wires 51, 52 toward engagement with carrier 24 and blade track segment 26.

Carrier 24 included in each shroud segment 22 is formed to include a body plate 32, case hangers 34, and seal supports 36 as shown in FIGS. 3 and 5. The body plate 32 is illustratively an arcuate plate shaped to extend part-way around the central axis A and formed to include a hole 31 for use in mounting carrier 24 to blade track segment 26. Case hangers 34 are configured to couple shroud segment 22 to turbine case 15 or other structure and extend outward in a radial direction from body plate 32. Seal supports 36 extend inward in a radial direction from body plate 32 and cooperate with body plate 32 to define interior carrier space 25.

Each seal support 36 defines a corresponding radially-inwardly opening channel 35 that receives multi-piece seal 30. Seal supports 36 of carrier 24 are formed to include a plurality of buffer air passages 37 that inject high pressure buffer air 41 from compressor 14 into radially-inwardly opening channel 35 to encourage at least a portion of multi-piece seal 30 toward engagement with carrier 24 and blade track segment 26 so that multi-piece seal 30 resists the flow of gasses through interface 29 as shown in FIGS. 2-4.

Radially-inwardly opening channel 35 is defined by an outer surface 44, and inner surface 46 and an upper surface 48 as shown in FIG. 4. Outer surface 44 faces toward interior carrier space 25. Inner surface 46 faces away from interior carrier space 25. Upper surface 48 forms the radially outer boundary of radially-inwardly opening channel 35 and faces inward toward multi-piece seal 30. Outer surface 44 and inner surface 46 extend away from upper surface 48 at diverging angles and retain multi-piece seal 30 within radially-inwardly opening channel 35.

Blade track segment 26 includes an attachment portion 38 and a runner 40 as shown in FIGS. 3 and 4. Attachment portion 38 extents radially outward from runner 40 and is received within interior carrier space 25 of carrier 24. Attachment portion 38 is formed to include an interior attachment space 39 for use in mounting blade track segment 26 onto carrier 24. Runner 40 provides a direct gas path boundary for turbine segment 22 and extends away from attachment portion 28 in the axial and circumferential directions.

As noted above, multi-piece seal 30 includes a first wire 51, a second wire 52, and a rope 54 as shown in FIG. 4. First wire 51 is arranged along outer surface 44 of radially-inwardly opening channel 35 and engages runner 40 of blade track segment 26. Second wire 52 is arranged along inner surface 46 of radially-inwardly opening channel 35 and engages runner 40 of blade track segment 26. Rope 54 is a braided sheath arranged between first wire 51 and second wire 52 and is formed to include an internal hollow 53. Internal hollow 53 communicates high pressure buffer air 41 from buffer air passages 37 to first wire 51 and second wire 52.

Rope 54 is sized to engage first wire 51 and second wire 52 such that first wire 51 and second wire 52 are pushed away from one another by high pressure buffer air 41 and radially inward into engagement with carrier 24 and runner 40 of blade track segment 26. Additionally, outer sidewall 44 and inner sidewall 46 of radially-inwardly opening channel 35 are angled to aid in retaining first wire 51 and second wire 52 axially forward and axially aft, respectively. In this way, rope 54, outer sidewall 44, and inner sidewall 46 cooperate to push first wire 51 and second wire 52 into engagement with carrier 24 and runner 40 within interface 29.

First and second wires 51, 52 have a circular cross section as shown in FIGS. 3 and 4. However, any suitable cross section may be used to establish a suitable seal between carrier 24 and runner 40. In the illustrative embodiment, first wire 51 and second wire 52 are formed of nickel alloy or another suitable metallic material adapted to withstand high temperatures produced by gas turbine engine 10. In other embodiments, a ceramic containing material may be used.

Rope 54, when assembled into multi-piece seal 30, forms a flared top 60, a first concave side 62, and a second concave side 64 as shown in the cross section view of rope 54 in FIG. 4. Rope 54 is a hollow braided or woven rope configured to permeably conduct buffer air 41 from buffer air passages 37 into internal hollow 53. Flared top 60 extends into radially-inwardly opening channel 35 and engages outer surface 44, inner surface 46, and upper surface 48. First concave side 62 extends radially-inward from flared top 60 and is established via engagement with first wire 51. Opposite first concave side 62, second concave side 64 extends radially-inward from flared top 60 and is established via engagement with second wire 52. Rope 54 is illustratively air permeable and formed of nickel alloy or another suitable metallic material adapted to provide resistance against high temperatures within gas turbine engine 10. However, other suitable materials such as ceramic or other high-temperature resistant material may be used.

First wire 51 and second wire 52 may form first concave side 62 and second concave side 64 when multi-piece seal 30 is assembled within radially-inwardly opening channel 35 as shown in FIG. 4. As such, rope 54 may have a circular cross-section prior to being assembled within radially-inwardly opening channel 35 with first wire 51 and second wire 52. However, rope 54 may be manufactured with flared top 60 and first and second concave sides 62, 64 or any other suitable shape sufficient to push first wire 51 and second wire 52 away from one another and radially inward into engagement with carrier 24 and runner 40.

Multi-piece seal 30 is configured to resist the flow of gasses through interface 29 using pressure differentials in regions surrounding radially-inwardly opening channel 35 as suggested in FIGS. 3 and 4. In the illustrative example, regions adjacent the multi-piece seal 30 include a high pressure region 43 in communication with flow path 17 and a low pressure region 45 in communication with carrier cavity 25. High pressure buffer air 41 is injected into radially-inwardly opening channel 35 through buffer air passages 37 to establish a higher pressure within radially-inwardly opening channel 35 than high pressure region 43 and low pressure region 45. The pressure differences between radially-inwardly opening channel 35, high pressure region 43, and low pressure region 45 encourage second wire 52 to remain engaged with carrier 24 and runner 40 within interface 29 to resist the flow of hot gasses into interior carrier region 25. As such, air leakage (if any) will flow from radially-inwardly opening channel 35 through interface 29 into high pressure region 43.

In the illustrative embodiment, multi-piece seal 30 includes a forward seal portion 531, and aft seal portion 532, a first circumferential seal portion 533, and a second circumferential seal portion 534 as shown in FIG. 5. Radially-inwardly opening channel 35 likewise includes a forward channel 535, an aft channel 536, a first circumferential channel 537 and a second circumferential channel 538. Forward seal portion 531, aft seal portion 532, and first and second circumferential seal portions 533, 534 are each arranged to be contained within a forward channel portion 535, an aft channel portion 536, a first circumferential channel portion 537, and a second circumferential channel portion 538, respectively. As such, each seal portion cooperates with respective channel portions to resist the flow of hot gasses through interface 29 formed between runner 40 and carrier 24 around all sides of turbine shroud segment 22 as shown in FIGS. 4-8.

Figure 6:
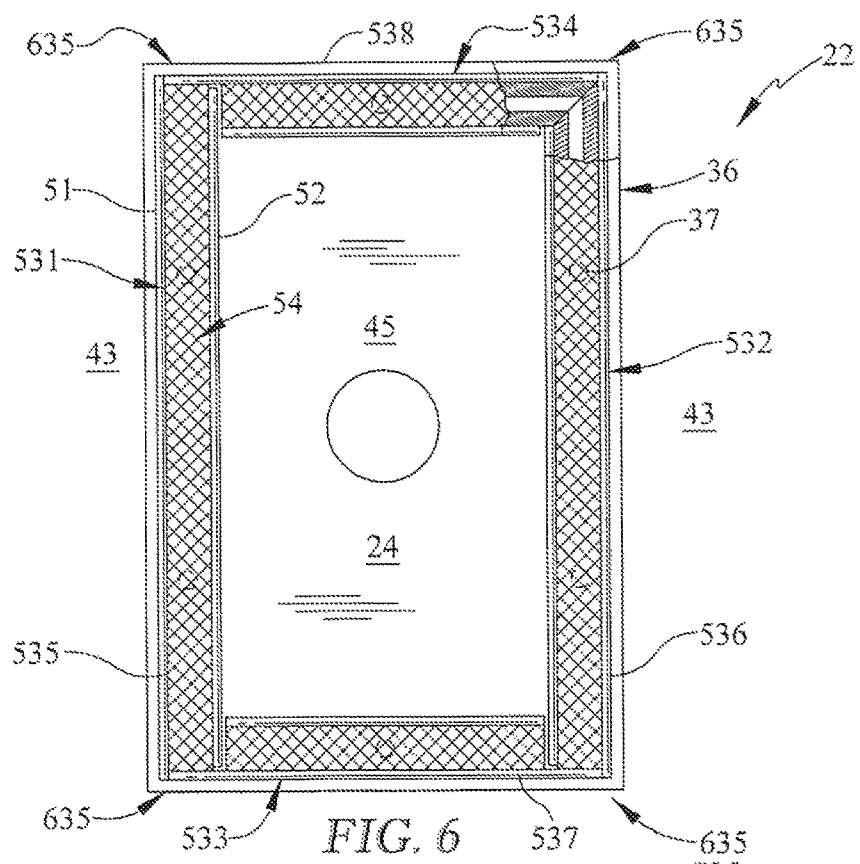
FIG. 6 is a plan view showing a first arrangement of the multi-piece seal disposed around the carrier and contained within the radially-inwardly opening channel, the radially-inwardly opening channel forming mitered corners at intersections of adjacent radially-inwardly opening channels and showing at least a portion of the first and second circumferential seal portions arranged to overlap at least a portion of the forward seal portion and at least a portion the aft seal portion.
Figure 7:
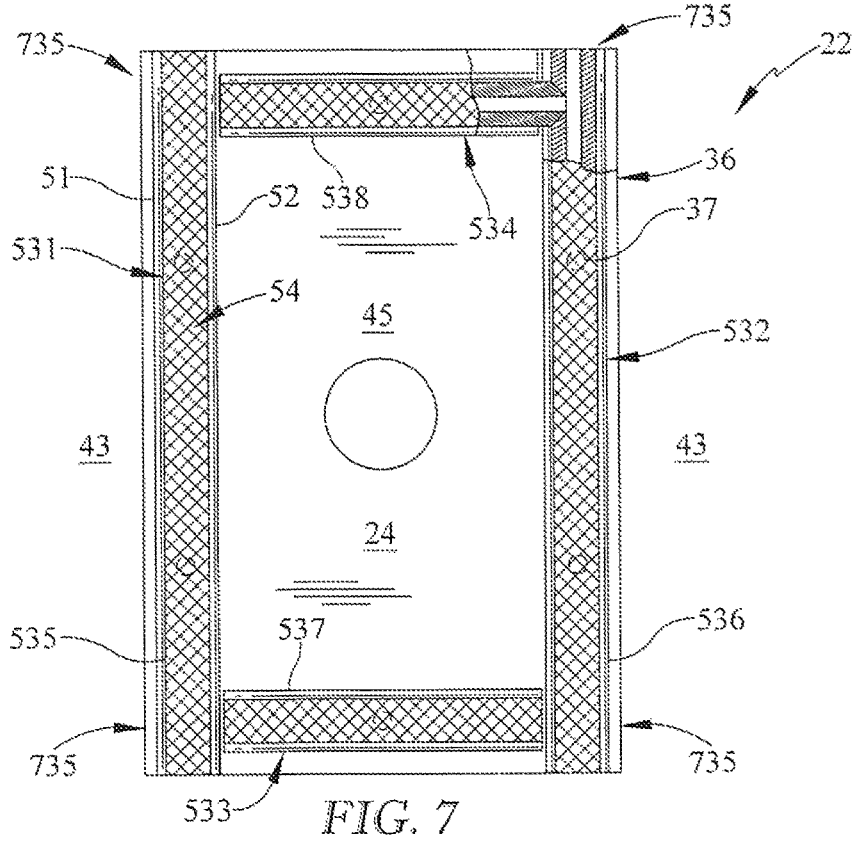
FIG. 7 is a plan view showing a second arrangement of the multi-piece seal disposed around the carrier and contained within the radially-inwardly opening channel, the radially-inwardly opening channel forming tapered regions at the intersections of adjacent radially-inwardly opening channels and showing at least a portion of the forward seal portion and at least a portion the aft seal portion overlap the first and second circumferential seal portions.
Figure 8:
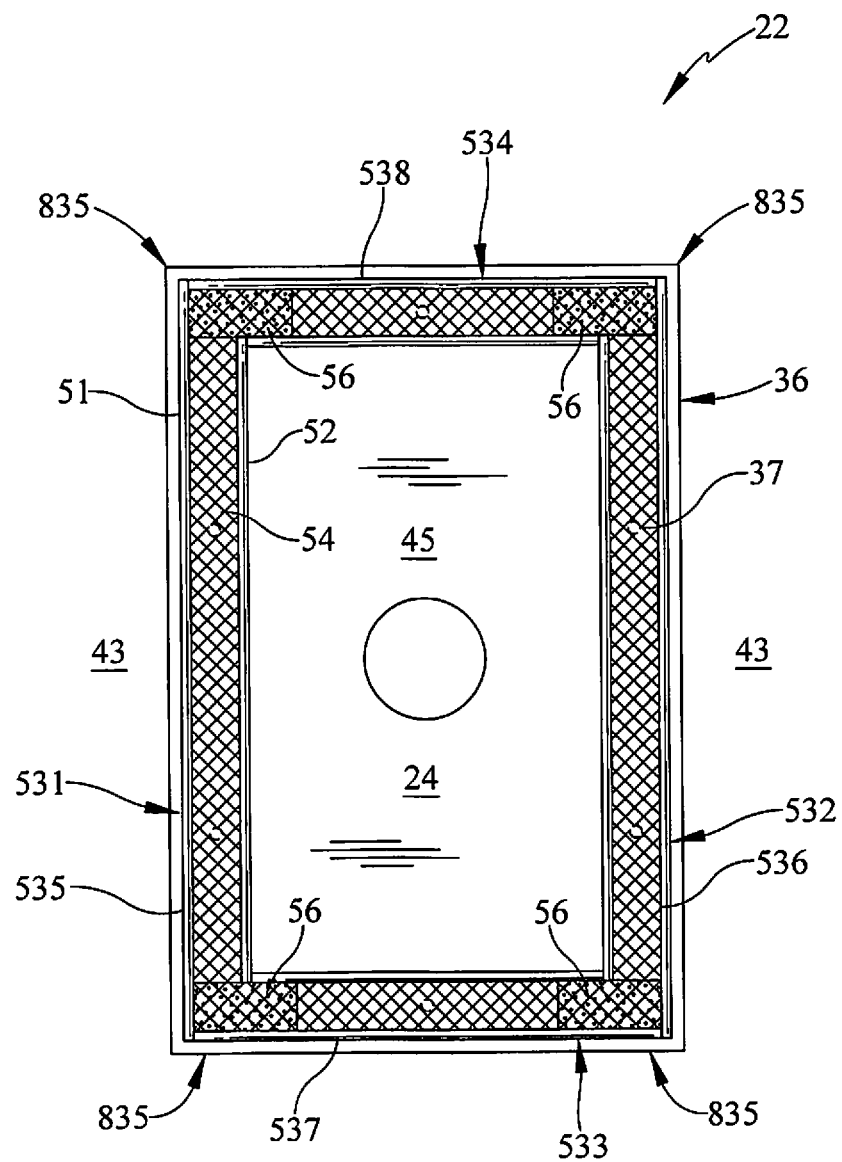
FIG. 8 is a plan view showing a third arrangement of the multi-piece seal disposed around the carrier and contained within the radially-inwardly opening channel and showing that the ropes of the multi-piece seal are empty braided sheath ropes formed to include cores arranged in corner portions of the radially-inwardly opening channel and a hollow arranged between the cores and showing that the empty braided sheath ropes are adjacent buffer air feed holes positioned at various locations along the multi-piece seal.

The portions of multi-piece seal 30 may be arranged in various positions to resist the flow of hot gasses through interface 29 as shown in FIG. 6-8. In one embodiment, radially-inwardly opening channel 35 may include mitered corners 635 as shown in FIG. 6. Radially-inwardly opening channel 35 and mitered corners 635 may be formed into carrier 24 using electrical discharge machining (EDM), electrochemical machining (ECM), or any other suitable method. The arrangement shown in FIG. 6 shows radially-inwardly opening channel 35 and multi-piece seal 30 fully contained within body plate 32 and seal supports 38 of carrier 24.

As shown in the illustrative embodiment in FIG. 6, first wire 51 of seal portions 531, 532, 533, and 534 each extend substantially across the length of respective channel portions 535, 536, 537, and 538. Rope 54 of seal portions 531 and 532 also extend substantially across the length of respective channel portions 535 and 536. Second wire 52 of seal portions 531 and 532 extend from first wire 51 of first circumferential seal portion 533 to first wire 51 of second circumferential seal portion 534. Second wire 52 of seal portions 533 and 534 extend from second wire 52 of forward seal portion 531 to second wire 52 of aft seal portion 532. Rope 54 of seal portions of seal portions 533 and 534 also extend from second wire 52 of forward seal portion 531 to second wire 52 of aft seal portion 532. This overlap of different portions of wires 51 and 52 and rope 54 restrict flow of hot gasses through any gaps between seal portions 531, 532, 533, and 534 at mitered corners 635.

Another arrangement of seal portions 531, 532, 533, and 534 and channel portions 535, 536, 537, and 538 is shown in FIG. 7. In this arrangement, channel portions 535 and 536 extend across the full length of seal supports 38 of carrier 24. Additionally, first wire 51, second wire 52, and rope 54 of forward and aft seal portions 531 and 532 also extend along the full length of seal supports 38. This arrangement may allow for the use of simpler channel forming techniques for forward and aft channel portions 535 and 536 such as with the use of a larger diameter grinding wheel and without the need for electrical discharge machining or electrochemical machining.

First and second circumferential channel portions 537 and 538 may be formed using electrical discharge machining, electrochemical machining, or any other suitable method. First and second circumferential channel portions 537 and 538 intersect forward and aft channel portions 535 and 536 to form intersected channel regions 735 as shown in FIG. 7.

Another arrangement of seal portions 531, 532, 533, and 534 and channel portions 535, 536, 537, and 538 is shown in FIG. 8. Multi-piece seal 30 further includes cores 56 that are arranged at various locations within rope 54 to resist leakage of hot gases through corners 835 of multi-piece seal 30. Cores 56 are made from a ceramic material comprising ceramic fibers and substantially resist the flow of hot gasses through any gaps between seal portions 531, 532, 533, and 534 at corners 835. Corners 835 may be mitered or formed in any suitable arrangement to retain rope 54 and cores 56 within channel radially-inwardly opening channel 35 and resist the flow of gases through any gaps in corners 835.

Cores 56 are arranged to extend within rope 54 of first and second circumferential seal portions 533 and 534 as shown in FIG. 8. At least a portion of first wire 51 of seal portions 531 and 532 are arranged to overlap first wire 51 of seal portions 533 and 534 as shown in FIG. 8. Additionally, at least a portion of second wire 52 of seal portions 531 and 532 are arranged to overlap second wire 52 of seal portions 533 and 534. In this way, any gaps within corners 835 will be directed toward cores 56 within rope 54 of first and second circumferential seal portions 533 and 534 where the flow of gasses will be restricted by cores 56.

The mounting system 28 is configured to couple blade track segments 26 to carrier 24 upon radial movement of the blade track segment 26 relative to carrier 24 as suggested in FIG. 5. Accordingly, multi-piece seal 30 can be maintained in position radially between blade track segment 26 and carrier 24 during assembly without having to accommodate circumferential sliding of blade track segment 26 relative to carrier 24.

In the illustrative embodiment, mounting system 28 includes a nut 70, a threaded shaft 72, a biasing spring 74 and a retainer plate 76 as shown in FIG. 5. Nut 70 is configured to receive a first end of threaded shaft 72 on a radially outer side of turbine case 15. Threaded shaft 72 is configured to be received within hole 31 through body plate 32, biasing spring 74, blade track segment 26 and retainer plate 76 and is configured to couple to both nut 70 and retainer plate 76 to support turbine shroud assembly 20 within turbine 18. Biasing spring 74 is arranged between carrier 24 and blade track segment 26 and is configured to evenly distribute stresses from blade track segment 26 to carrier 24. Retainer plate 76 is configured to receive a second end of threaded shaft 72 within interior attachment space 39 to retain turbine shroud assembly 20 against turbine case 15 as shown in FIG. 3.

Multi-piece seal 30, described above and shown in FIG. 4, may be used in other structures and components within gas turbine engine 10 to resist the flow of hot gasses through various interfaces. Additionally, sufficient sealing may be accomplished with other types of components where the pressure differential between adjacent cavities is very small.

Figure 9:
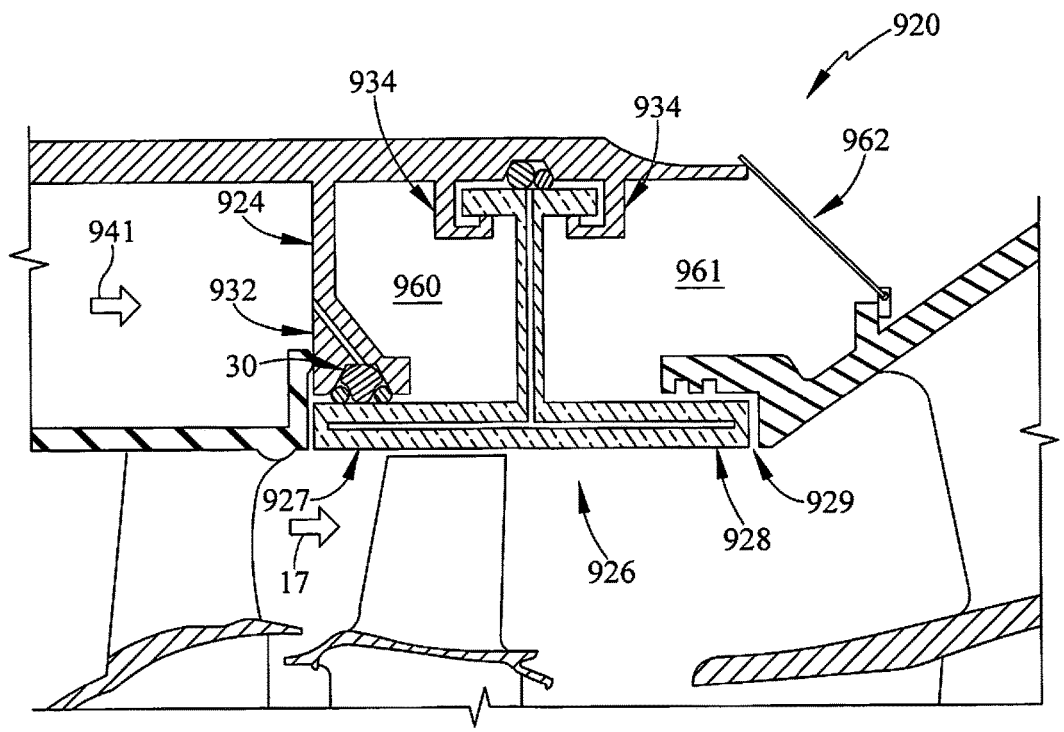
FIG. 9 is a detailed cross-sectional view of another turbine shroud assembly adapted for use in the gas turbine engine of FIG. 1 showing that the turbine shroud assembly includes a carrier, a blade track segment that has an I-beam cross sectional shape, and a multi-piece seal located along a forward side of the blade track segment, and showing that a gap is formed between the carrier and the blade track segment along an aft side of the blade track segment.
Figure 10:
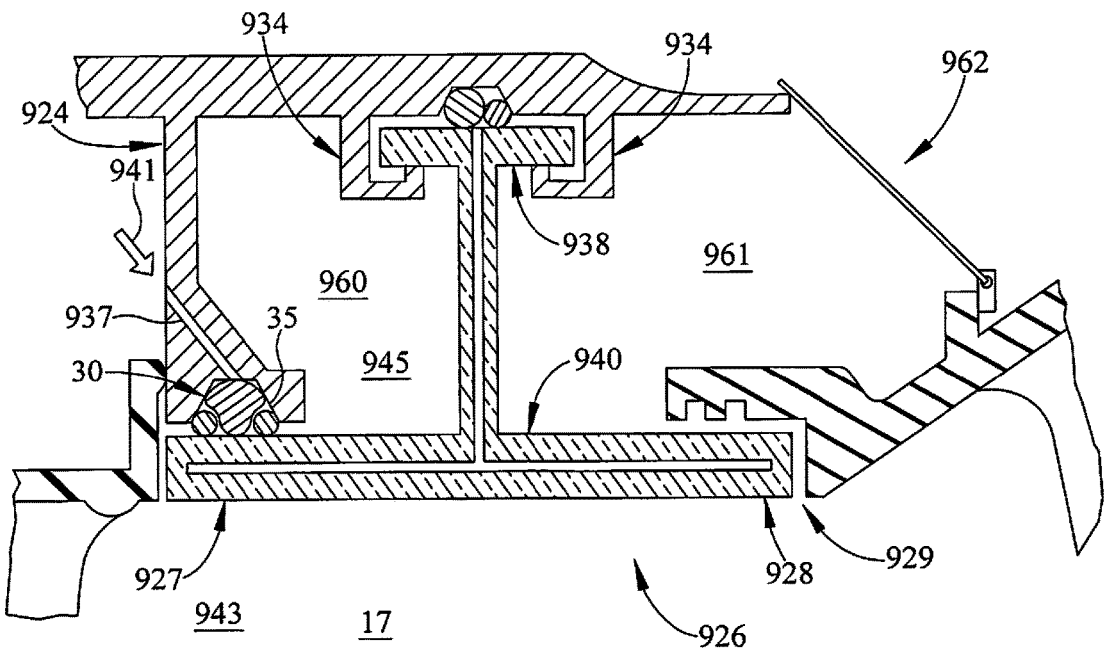
FIG. 10 is an enlarged detail view of the turbine shroud assembly of FIG. 9 showing a buffer air source supplying buffer air through a buffer air passage and into a radially-inwardly opening channel containing the multi-piece seal.
Figure 11:
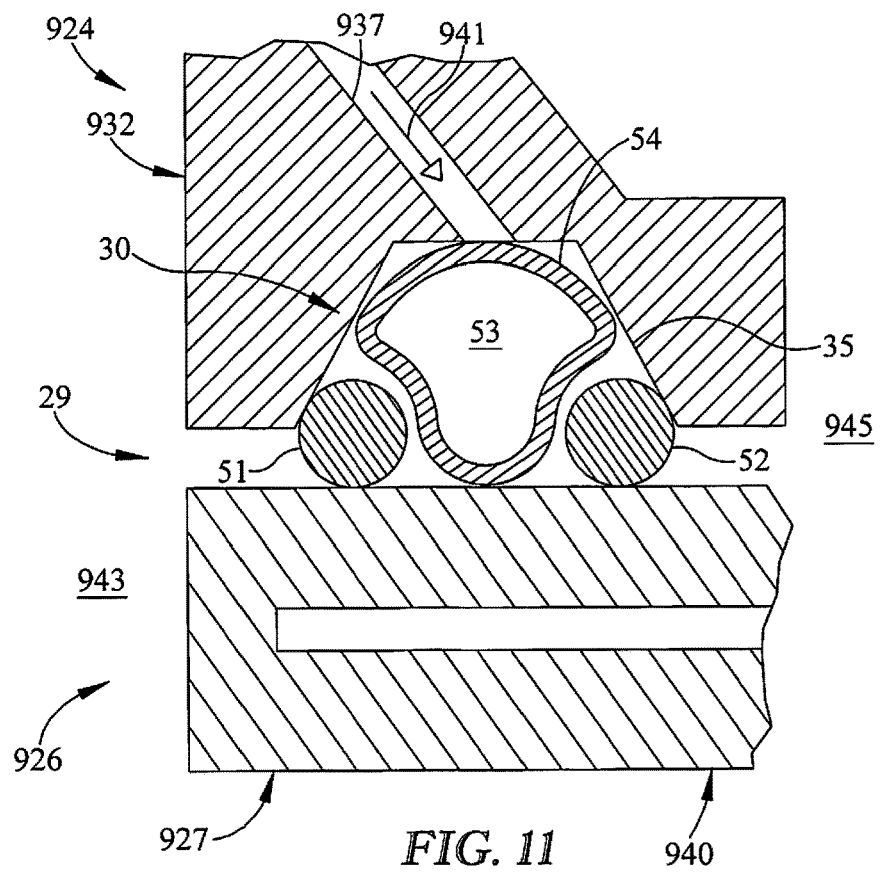
FIG. 11 is a detail view of the multi-piece seal from FIG. 10 illustrating forces exerted on a first wire seal and a second wire seal from the blade track segment and showing that the first wire seal and the second wire seal resist the passage of air through openings formed between the carrier and the blade track segment.

A cross section view of turbine shroud segment 922 is shown in FIGS. 9-11 illustrating the use of multi-piece seal 30 in one such structure. Turbine shroud segment 922 includes a carrier 924, a blade track segment 926, and multi-piece seal 30 arranged along a forward side 927 of blade track segment 926 as shown in FIGS. 9 and 10. blade track segment 926, sometimes called a heat shield, comprises a ceramic matrix composite material. An aft side 928 of blade track segment 926 is disengaged from other parts of gas turbine engine 10 to allow controlled flow of gasses through a gap 929 adjacent aft side 928, into aft cavity 961, and out of a flapper seal 962. As such, turbine shroud segment 922 is configured to operate with lower stresses on blade track segment 926 by providing a lower pressure along aft side 928. The pressure along aft side 928 may be relatively the same as the pressure within aft cavity 961.

Carrier 924 includes a seal support 932 and attachment hooks 934 as shown in FIGS. 9 and 10. Seal support 932 is formed to include a radially-inwardly opening channel 935 and buffer air passages 937 for communicating high pressure buffer air 941 from compressor 14 into radially-inwardly opening channel 935. Attachment hooks 934 are configured to mount blade track segment 926 to carrier 924.

Blade track segment 926 includes a T-shaped attachment portion 938, a runner 940, and a tandem seal 942 as shown in FIGS. 9 and 10. Attachment portion 938 cooperates with runner 940 such that the entire heat shield 926 forms an I-beam shape when viewed in the circumferential direction. Gap 929 is formed between carrier 924 and runner 940 along aft side 928 of blade track segment 926 axially aft of attachment portion 938 without a seal that engages the runner 940 of blade track segment 926 such that a mechanical moment is not induced onto runner 940 by engagement of runner 940 aft of attachment portion 938. Tandem seal 940 is configured to resist the flow of gasses between a forward cavity 960 located axially forward of attachment portion 938 of blade track segment 926 and aft cavity 961.

Multi-piece seal 30 is arranged along forward side 927 of blade track segment 926 to resist the flow of hot gasses from flow path 17 to forward cavity 960 as shown in FIGS. 10 and 11. The location of multi-piece seal 30 establishes a high pressure region 943 within flow path 17 and a low pressure region 945 within forward cavity 960. High pressure buffer air 941 is provided by compressor 14 and injected into radially-inwardly opening channel 35 through buffer air passages 937. This provides a greater pressure within radially-inwardly opening channel 935 than that in high pressure region 943 and low pressure region 945.

The pressure differences between radially-inwardly opening channel 35, high pressure region 943, and low pressure region 945 encourage second wire 52 to remain engaged with carrier 924 and runner 940 within interface 29 to resist the flow of hot gasses into forward cavity 960. As such, air leakage (if any) will flow from radially-inwardly opening channel 35, through interface 29 and into high pressure region 943 as shown in FIG. 11.

Figure 12:
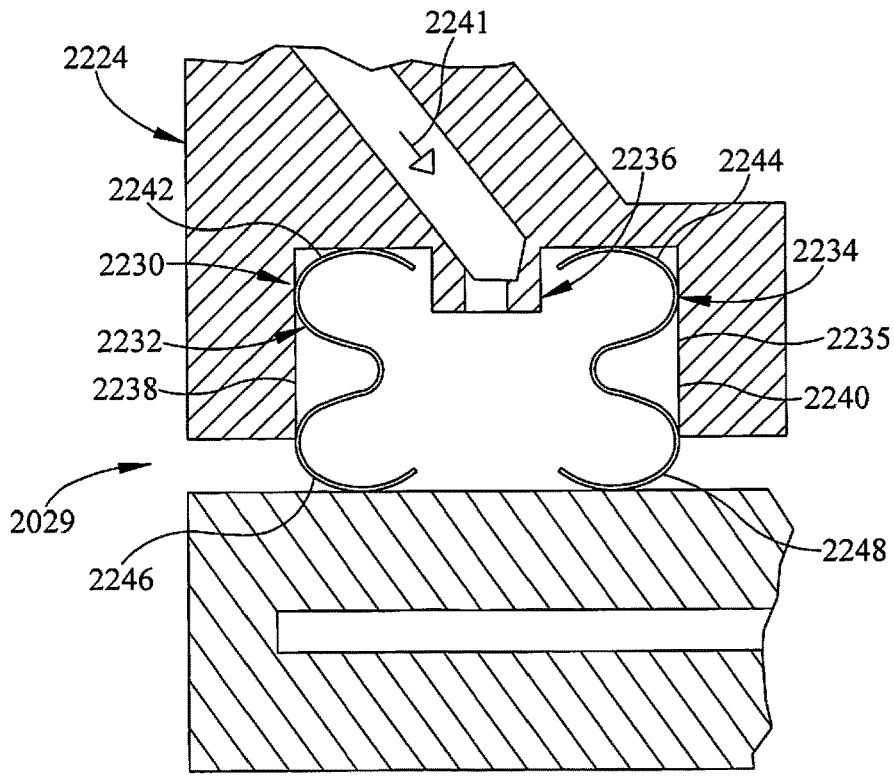
FIG. 12 is a detail view of another multi-piece seal showing the multi-piece seal contained within a radially-inwardly opening channel and positioned by a locator extending into the radially-inwardly opening channel and forming a buffer air passage for injection of buffer air into the radially-inwardly opening channel, the multi-piece seal including a forward seal element and an aft seal element, each seal element having an E-shaped cross section forming a plurality of lobes.

Another embodiment of a multi-piece seal 2230 arranged within a carrier 2224 is shown in FIG. 12. Multi-piece seal 230 includes a forward seal element 2232 and an aft seal element 2234 as shown in FIG. 12. Forward seal element 2232 is arranged along a forward side 2238 of a radially-inwardly opening channel 2235 and aft seal element 2234 is arranged along an aft side 2240 of radially-inwardly opening channel 2235. Forward side 2238 and aft side 2240 of radially-inwardly opening channel 2235 extend in the radial direction relative to axis A of gas turbine engine 10. However, any suitable side angle may be used to provide sufficient support for a seal within a channel or groove.

Carrier 2224 is formed to include at least one air buffer passage 2237 for communicating high pressure buffer air 2241 into radially-inwardly opening channel 2235 through a locator 2236 as shown in FIG. 12. Locator 2236 is arranged between forward element 2232 and aft element 2234 to position forward element 2232 and aft element 2234 in proper alignment as shown in FIG. 12.

Forward seal element 2232 and the aft seal element 2234 are formed to include first lobes 2242, 2244 and second lobes 2246, 2248, respectively, such that forward seal element 2232 and aft seal element 2234 have E-shape cross-sections when viewed in the circumferential direction as shown in FIG. 12. First lobes 2242, 2244 and second lobes 2246, 2248 are concave and open into radially-inwardly opening channel 2235 to face locator 2236 and expand in opposite radial directions upon receipt of buffer air 2241 from buffer air passages 2237. As such, second lobes 2246, 2248 expand into interface 29 to resist the flow of hot gasses into interface 2029. Any number of lobes may be used to establish an adequate sealing structure.

In an illustrative embodiment, the simplest form of this seal may be to form a circumferential seal between two components. This may be done using a split ring configuration (like a piston ring) to enable assembly. Air may leak through the split gap. In an illustrative embodiment, the seal may be more likely to be segmented to be assembled with the seal segments. This may leave more split lines, and therefore more air will leak through these gaps.

In an illustrative embodiment, another use of this seal may be as a perimeter seal. Because the multi-piece seal may work by pressure loading the wire against the angled side wall of the groove, the wire seals on a perimeter seal may not be a full hoop. In an illustrative embodiment, a full hoop may carry pressure load as circumferential stress instead of transmitting the pressure load through the wire, into the angled groove surface. In an illustrative embodiment, the wire must be split in enough places to enable the wire to move against the angled groove wall as pressure is applied. In an illustrative embodiment, the gaps in the corners may lead to excessive leakage (parasitic loss) and manufacturing the groove in a rectangular form could be challenging.

In an illustrative embodiment, milling with a formed tool with the axis of rotation perpendicular to the mating surface could make a perimeter seal groove if the corners were radiused. In an illustrative embodiment, the corners of the perimeter seal may be square or the difference in form of the wire vs. the form of the perimeter contour would lead to extra leakage through the wire seal. In an illustrative embodiment, groove manufacturing in this way may lead to higher leakage as well as higher cost due to the small diameter of the formed cutter. The groove could be electro-chemical machined or electrical discharge machined. If electrical discharge machined, subsequent finishing of the sealing surfaces may be required.

In an illustrative embodiment, leading edge (LE) and trailing edge (TE) segments of the groove may be fully circumferential. In an illustrative embodiment, this may enable grinding of those portions of the groove (tool rotation axis can be parallel to the mating surface so larger diameter grinding wheels could be used for these portions of the groove). In an illustrative embodiment, this may minimize the length of seal groove that would require more costly manufacturing (ECM, EDM with seal surface finishing, or grinding with small diameter tooling). In an illustrative embodiment, this may enable the use of a small diameter cutter on the cross-groove portions without having to radius the corners of the perimeter contour. In an illustrative embodiment, this configuration may enable that type of manufacturing of the groove.

In an illustrative embodiment, air may leak out the corner gaps. In an illustrative embodiment, empty, braided sheath and rope seal lengths as backing for the wire seals may be used. In an illustrative embodiment, using short lengths of rope seal adjacent to the gaps would restrict leakage flow while still minimizing overall seal load and while allowing buffer air to flow through the bulk of the groove length. In an illustrative embodiment, lengths of empty braided sheath may be omitted if seal performance and durability and location of rope seals prove acceptable throughout life of the part. For instance, in an illustrative embodiment, the configuration may be designed such that buffer pressure loads the sections of rope seal against the corner gap areas such that the rope seal would not "walk" out of position along the groove. In an illustrative embodiment, the empty sheath can be used to ensure the lengths of rope seal remain in the correct locations.

In an illustrative embodiment, a benefit of the embodiment shown in FIG. 8 may be the ability to have different buffering pressures at different portions of the perimeter. In an illustrative embodiment, slightly lower buffer pressure could be used in locations with lower pressure outside the perimeter seal. In an illustrative embodiment, the groove cavity pressure along the TE could be lower than the groove cavity pressure along the LE. In this way, there would be less parasitic leakage along the TE.

In illustrative embodiments, the "I" beam seal segment design may be used to provide an easier to manufacture design with lower stress by lowering back side pressure. This may allow controlled hot gas ingress at a level that may be acceptable.

In illustrative embodiments, the pressure in the cavities may be close to that on the flowpath so there is little delta P creating mechanical stress in the CMC. In illustrative embodiments, the problem is that hot gas ingress may not be kept low enough to avoid lifting issues. In illustrative embodiments, the delta P from the leading edge (LE) to the tailing edge (TE) may be very large and the gaps at the single bulkhead strip seals and tandem seal may be too large to reasonably control flow. In illustrative embodiments, this large flow may hurt performance and life/durability.

In illustrative embodiments, one may tighten the sealing capability at the LE and TE. In illustrative embodiments, this may reduce the flow by increasing the pressure within the cavities and might increase mechanical loads and resulting stresses. In illustrative embodiments, this may also add seal loads into the CMC, increasing mechanical stresses.

In illustrative embodiments, one may use a two-sided tandem seal along the LE to create a buffered seal arrangement along the LE. In illustrative embodiments, a small area of high pressure may increase pressure loading in that region (between the wire seals). In illustrative embodiments, this increase may be much less than it would be if the whole forward cavity increased in pressure. In illustrative embodiments, this increase may also be offset by reducing the pressure in the forward cavity below that of the flowpath.

In illustrative embodiments, the buffered seal may prevent hot gas ingress over the leading edge. In illustrative embodiments, the gas flowing across the hanger bulkhead and through the aft cavity may be much lower in temperature, improving life. In illustrative embodiments, it may be possible to drop pressure to that of the aft cavity. If so, in illustrative embodiments, then the vertical strip seal and tandem seal over the hanger may be removed. This may lower part costs and may make assembly easier. In illustrative embodiments, the tandem seal may add seal loading to the backside of the CMC seal segment.

In illustrative embodiments, the seal could be located axially close to the base of the hanger to minimize bending loads. In illustrative embodiments, if pressure is reduced below flowpath pressure in the forward cavity, then the seal may want to be close to the LE so the opposite pressure loading (net force acting radially outward) can cancel out some of the seal loading bending stress. In illustrative embodiments, this may cause turbine efficiency to improve due to a significant decrease in tip bypass flow.

In illustrative embodiments, the buffer seal may be different than the dual sided tandem seal. For instance, inward facing "E" seal segments may also be used.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use in a gas turbine engine, the assembly comprising
a carrier comprising metallic materials,
a blade track segment comprising ceramic matrix composite materials, the blade track segment formed to include a runner shaped to extend partway around a central axis and an attachment portion that extends radially outward from the runner that mounts to the carrier to couple the blade track segment to the carrier, and
a multi-piece seal including components received in a first radially-inwardly opening channel formed in the carrier, the multi-piece seal engages the runner of the blade track segment to resist the flow of gasses through an interface between the carrier and the runner of the blade track segment,
wherein the multi-piece seal includes a forward wire arranged along a forward side of the first radially-inwardly opening channel, an aft wire arranged along an aft side of the first radially-inwardly opening channel, and a rope seal arranged in the first radially-inwardly opening channel between the forward wire seal and the aft wire seal, and wherein the rope seal is sized to engage the forward wire seal and the aft wire seal such that the forward wire seal and the aft wire seal are pushed away from one another and radially inward into engagement with the carrier and the runner of the blade track segment,
wherein the first radially-inwardly opening channel is arranged along a forward side of the blade track segment axially forward of the attachment portion of the blade track segment, and
wherein the carrier is formed to include a second radially-inwardly opening channel that opens to face the runner of the blade track segment, wherein the multi-piece seal includes (i) a second forward wire arranged along a forward side of the second radially-inwardly opening channel, (ii) a second aft wire arranged along an aft side of the second radially-inwardly opening channel, and (iii) a second rope seal arranged in the second radially-inwardly opening channel between the second forward wire seal and the second aft wire seal, and wherein the second rope seal sized to engage the second forward wire seal and the second aft wire seal such that the second forward wire seal and the second aft wire seal are pushed away from one another and radially inward into engagement with the carrier along a side of the second radially-inwardly opening channel and the runner of the blade track segment.

2. The assembly of claim 1, wherein the carrier is formed to include a plurality of buffer air passages spaced circumferentially around the radially-inwardly opening channel from one another and shaped to conduct buffer air into the radially-inwardly opening channel.

3. The assembly of claim 2, wherein the rope seal is a hollow braided or woven rope configured to permeably conduct buffer air from the buffer air passages into an internal hollow of the rope seal.

4. The assembly of claim 3, wherein the rope seal includes ceramic core portions sized and arranged to be spaced apart from discharge openings formed by each of the plurality of buffer air passages.

5. The assembly of claim 1, wherein the second radially-inwardly opening channel is arranged along an aft side of the blade track segment axially aft of the attachment portion of the blade track segment.

6. The assembly of claim 5, wherein the carrier is formed to include axially-extending radially-inwardly opening channels that open to face the runner of the blade track segment, the axially-extending radially-inwardly opening channels interconnect the first radially-inwardly opening channel and the second radially-inwardly opening channel, and the multi-piece seal includes components received in the axially-extending radially-inwardly opening channels such that the multi-piece seal surrounds the attachment portion of the blade track segment on forward, aft, and circumferential sides.

7. The assembly of claim 1, wherein the attachment portion of the blade track segment forms a T shape when viewed in the circumferential direction such that the entire blade track segment forms an I-beam shape when viewed in the circumferential direction.

8. The assembly of claim 7, wherein a gap is formed between the carrier and the runner of the blade track segment along an aft side of the blade track segment axially aft of the attachment portion of the blade track segment without an intervening seal that engages the runner of the blade track segment such that a mechanical moment is not induced onto the runner of the blade track segment by engagement of the runner aft of the attachment portion.

9. An assembly adapted for use in a gas turbine engine, the assembly comprising a carrier component, a supported component, the supported component formed to include a heat shield shaped to extend partway around a central axis and an attachment portion that extends radially outward from the heat shield to couple the supported component to the carrier component, and a multi-piece seal including components received in a radially-inwardly opening channel formed in the carrier component, the multi-piece seal engages the heat shield of the supported component to resist the flow of gasses through an interface between the carrier component and the heat shield of the supported component, wherein the multi-piece seal includes a first wire arranged along a first side of the radially-inwardly opening channel, a second wire arranged along a second side of the first radially-inwardly opening channel, and a rope seal arranged in the radially-inwardly opening channel between the first wire seal and the second wire seal, and wherein the rope seal is sized to engage the first wire seal and the second wire seal such that the first wire seal and the second wire seal are pushed away from one another and radially inward into engagement with the carrier component and the heat shield of the supported component.

10. The assembly of claim 9, wherein the carrier component is formed to include a plurality of buffer air passages spaced from one another and shaped to conduct buffer air into the radially-inwardly opening channel.

11. The assembly of claim 10, wherein the rope seal is a hollow braided or woven rope configured to permeably conduct buffer air from the buffer air passages into an internal hollow of the rope seal.

12. The assembly of claim 10, wherein the rope seal is sized and arranged to be spaced apart from discharge openings formed by each of the plurality of buffer air passages.

13. The assembly of claim 9, wherein the carrier component comprises metallic materials and the supported component comprises ceramic materials.

14. The assembly of claim 13, wherein the supported component comprises ceramic matrix composite materials.

15. The assembly of claim 9, wherein the multi-piece seal surrounds the attachment portion of the supported component on forward, aft, and circumferential sides.

16. A turbine shroud assembly adapted for use in a gas turbine engine, the assembly comprising a carrier comprising metallic materials, the carrier formed to include a radially-inwardly opening channel and a plurality of buffer air passages spaced from one another and shaped to conduct buffer air into the radially-inwardly opening channel, a blade track segment comprising ceramic matrix composite materials, the blade track segment formed to include a runner shaped to extend partway around a central axis and an attachment portion that extends radially outward from the runner that engages the carrier to couple the blade track segment to the carrier, and a multi-piece seal received in a radially-inwardly opening channel formed in the carrier and engaged with the runner of the blade track segment to resist gasses from moving through an interface between the carrier and the blade track segment, the multi-piece seal including a forward seal element arranged along a forward side of the radially-inwardly opening channel and an aft seal element arranged along an aft side of the radially-inwardly opening channel, wherein the forward seal element includes a plurality of lobes arranged to receive buffer air from the buffer air passages formed in the carrier and shaped to cause the forward seal to expand in the radial direction upon receipt of buffer air from the buffer air passages formed in the carrier, and the aft seal element includes a plurality of lobes arranged to receive buffer air from the buffer air passages formed in the carrier and shaped to cause the aft seal to expand in the radial direction in response to receipt of buffer air from the buffer air passages formed in the carrier.

17. The assembly of claim 16, wherein each of the forward seal element and the aft seal element are formed to include two lobes such that each of the forward seal element and the aft seal element have an E-shape when viewed in the circumferential direction.

18. The assembly of claim 16, wherein the carrier is formed to include a locator that extends into the radially-inwardly opening channel between the first seal element and the second seal element, and at least one of the buffer air passages is formed through the locator.

* * * * *